June 14, 1966 J. A. WOLF 3,255,876
TEMPORARY HAND GRIP FOR SHARP EDGED ARTICLE
Filed Jan. 4, 1962 2 Sheets-Sheet 1

INVENTOR.
JOHN A. WOLF
BY *Ely, Pearne & Gordon*
Attorneys

INVENTOR.
JOHN A. WOLF
BY Ely, Pearne & Gordon
Attorneys

United States Patent Office 3,255,876
Patented June 14, 1966

3,255,876
TEMPORARY HAND GRIP FOR SHARP EDGED ARTICLE
John A. Wolf, Massillon, Ohio, assignor to Igelstroem-Oberlin, Inc., Massillon, Ohio, a corporation of Ohio
Filed Jan. 4, 1962, Ser. No. 164,241
2 Claims. (Cl. 206—62)

This invention relates to temporary hand grips. More particularly, this invention relates to temporary hand grips that are adapted to be affixed to the sharp edges of flat objects such as sheets of glass and metal for ease of handling and transporting these objects.

Heretofore, the transportation of glass or other sharp-edged sheet material which is moved or lifted by hand has presented a serious safety problem in that the sharp-edged material would cut the hands of the handler. This is particularly true in the glass industry where freshly cut glass presents a very sharp edge and necessitates the wearing of protective gloves as a safety measure. Furthermore, in the retail sales of glass, the usual procedure followed by the dealer is to wrap the glass in kraft and tie the package with string or twine. This is a time consuming operation, and frequently, the glass will cut through and slip out of the wrapping while it is being carried by the customer.

Another problem in the glass industry is the removal of the product identification labels by the ultimate consumer. These labels are glued to the glass by the manufacturer and/or the wholesale or retail seller and are difficult to remove.

This invention relates to a temporary hand grip and has for its principal objectives the provision of a hand grip that overcomes the problem discussed above. In particular, the invention contemplates the provision of an inexpensive hand grip that is adapted to be folded over and removably secured to the sharp edges of a glass sheet, eliminating the need for further packaging or product identification. A further object of the present invention is to provide a novel package consisting of a sheet of glass and a temporary hand grip permitting the glass to be conveniently and safely carried.

These and other objects of the invention will become apparent from the following description and the accompanying drawings.

Figure 1:
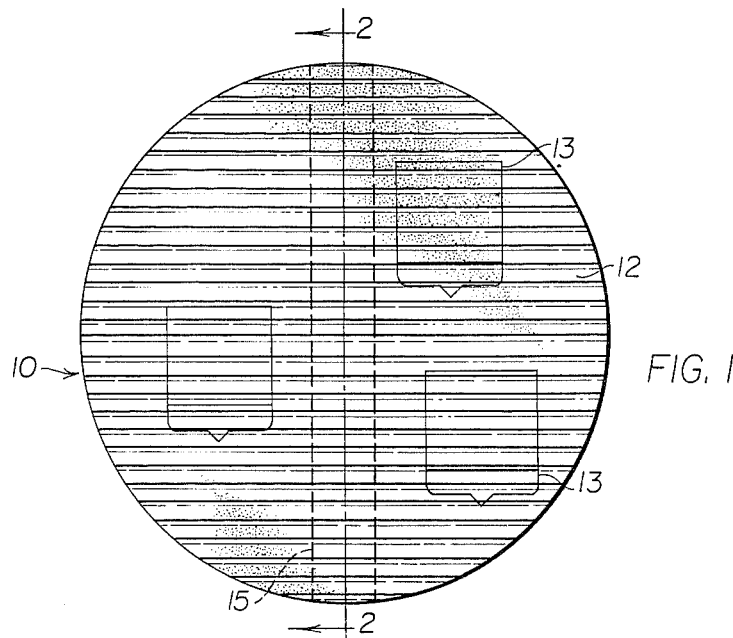
Figure 2:
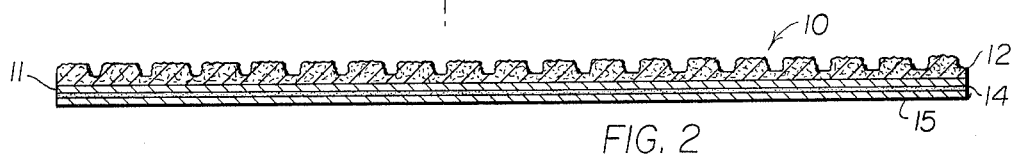
Figure 3:
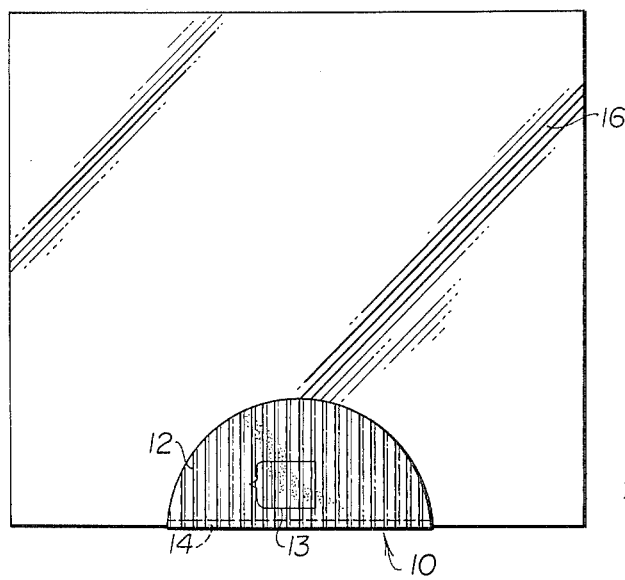
Figure 4:
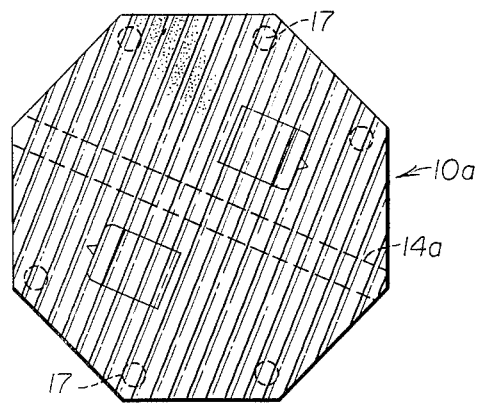
Figure 5:
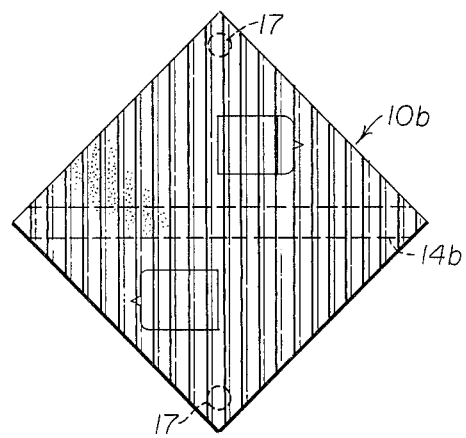
Figure 6:
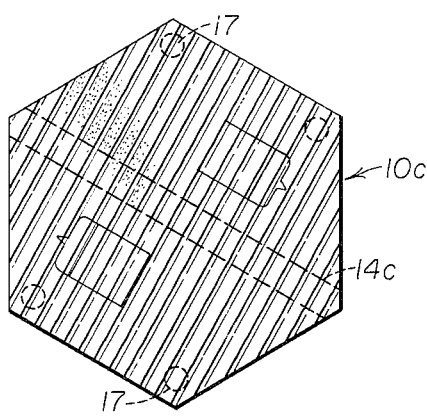

In the drawings:
FIGURE 1 is a top plan view of a temporary hand grip embodying the invention;
FIGURE 2 is a sectional view of the device of FIGURE 1, the plane of the section being indicated by the line 2—2 in FIG. 1, but showing the thickness of the various layers or laminates as being out of proportion for clarity;
FIGURE 3 is an elevational view of a package according to the present invention showing a temporary hand grip affixed to an edge portion of a sheet of glass;
FIGURE 4 is a top plan view of a temporary hand grip similar to FIG. 1 but showing a modification of the invention;
FIGURE 5 is a top plan view of still another modification of the invention; and
FIGURE 6 is a top plan view of still another modification of the invention.

In order that the invention may be better understood, reference is first made to FIGURES 1 and 2. A temporary hand grip 10 comprises a base 11 which, in the embodiment shown, is a strong, flexible, circular sheet of kraft paper. Affixed to the upper surface of the base 11 is a porous laminate 12 which is made of felted paper. The laminate is securely bonded to the upper surface of the base 11 by adhesive and, as is shown in FIGURES 1 and 2, has a corrugated upper surface. Thus, the laminate is able to absorb moisture or oil from the handler's hand and its corrugated upper surface resists slipping therefrom. Trademarks, trade names, or other identifying indicia 13 of the hand grip itself or the article to be carried may be printed on the surface of the felted laminate. The lower surface of the base 10 is coated with a strip of pressure sensitive adhesive 14 which is covered by a removable protective strip 15. The protective strip 15 is removably attached to the adhesive 14 and may suitably be made of glassine or other relatively non-adherent material.

In use, the protective strip 15 is removed from the pressure sensitive adhesive 14 and the adhesively coated portion of the hand grip 10 is secured to the edge of a sheet of glass 16, as is shown in FIGURE 3. The edges of the hand grip are then folded into the position shown in FIGURE 3 to form a package. The glass may safely be moved or lifted by grasping the hand grip.

The preferred hand grip 10 illustrated in FIGURES 1, 2, and 3 is circular in shape so that it will not provide sharp corners that might be torn during transportation. However, the hand grip may be shaped as shown in FIGURES 4, 5 and 6. A hand grip 10a is shown in FIGURE 4 which is octagonal in shape and has a strip of adhesive extending from opposite corners. FIGURE 5 shows another modified hand grip 10b which is square in shape and has a strip of adhesive 14b extending from opposite corners. A further modification of a hand grip is shown in FIGURE 6 wherein the hand grip 10c is shown to be hexagonal in shape. A strip of adhesive 14c extends from opposite corners of the hand grip 10c.

If desired, the temporary hand grips may be provided with auxiliary pressure sensitive adhesive areas 17 to secure the folded edge portions thereof to the surfaces of the glass sheet. The adhesive areas 17 are provided with protective glassine or similar relatively non-adherent patches (not shown) which are similar to the protective strip 15.

Obviously, many further modifications and variations of the invention will become apparent to those skilled in the art in the light of the above teachings. Therefore, it is to be understood that, within the spirit and scope of the appended claims, the invention may be practiced otherwise than as specifically shown and described.

What is claimed is:
1. A package comprising, in combination, a glass sheet having a sharp edge portion and a temporary hand grip comprising a strong, flexible sheet having one absorbent surface and one pressure sensitive, adhesive surface, said adhesive surface being wrapped over and adhesively secured to said sharp edge portion to cover said edge portion.
2. A package comprising, in combination, a glass sheet having a sharp edge portion and a temporary hand grip comprising a sheet of paper, a porous, corrugated laminate of felted paper securely bonded to one surface of said sheet of paper, a pressure sensitive adhesive strip bonded to the other surface of said sheet of paper, said adhesive strip being adhesively secured to said sharp edge portion.

References Cited by the Examiner

UNITED STATES PATENTS 1,256,818  2/1918  Nile.
2,030,135  2/1936  Carpenter _____ 229—48
2,860,081  11/1958  Eiken.
3,063,885  11/1962  Kieffer.

JOSEPH R. LECLAIR, *Primary Examiner.*

EARLE J. DRUMMOND, FRANKLIN T. GARRETT, THERON E. CONDON, *Examiners.*

R. PESHOCK, *Assistant Examiner.*